United States Patent
Yokogawa et al.

[11] Patent Number: 6,136,970
[45] Date of Patent: Oct. 24, 2000

[54] ASYMMETRIC DIOXAZINE COMPOUNDS AND METHOD FOR DYEING OR PRINTING FIBER MATERIALS USING THE SAME

[75] Inventors: Kazufumi Yokogawa, Munich, Germany; Takahiko Fujisaki, Toyonaka, Japan; Miyao Takahashi, Chiba-ken, Japan; Shigeru Kawabata; Naoki Harada, both of Ibaraki, Japan; Kingo Akahori, Toyonaka, Japan; Yutaka Kayane, Ikoma, Japan; Takashi Omura, Kobe, Japan

[73] Assignee: Sumitomo Chemical Company, Limited, Osaka, Japan

[21] Appl. No.: 07/967,617

[22] Filed: Oct. 29, 1992

[30] Foreign Application Priority Data

Nov. 5, 1991 [JP] Japan ............................ 3-288493

[51] Int. Cl.$^7$ ................................. C07D 498/04
[52] U.S. Cl. ....................... 544/76; 544/77; 8/549
[58] Field of Search .................. 544/76, 77; 8/549

[56] References Cited

U.S. PATENT DOCUMENTS

| | | | |
|---|---|---|---|
| 4,604,459 | 8/1986 | Jäger | 544/76 |
| 4,933,446 | 6/1990 | Sawamoto et al. | 544/76 |
| 5,122,605 | 6/1992 | Pedrazzi | 544/76 |
| 5,126,450 | 6/1992 | Smith | 544/77 |
| 5,478,936 | 12/1995 | Yokogawa et al. | 544/76 |

FOREIGN PATENT DOCUMENTS

| | | | |
|---|---|---|---|
| 0074928 | 3/1983 | European Pat. Off. | |
| 0076782 | 4/1983 | European Pat. Off. | |
| 0356014 | 2/1990 | European Pat. Off. | |
| 0385120 | 9/1990 | European Pat. Off. | |
| 472975 | 3/1992 | European Pat. Off. | 544/76 |
| 3423581 | 1/1986 | Germany. | |

OTHER PUBLICATIONS

Yokogawa, Chem. Abstract vol. 118, No. 8311c (Apr. 8, 1992).
Ridyard, Chem. Abstract vol. 113, No. 61309f (Feb. 28, 1990).

*Primary Examiner*—Richard L. Raymond
*Attorney, Agent, or Firm*—Stevens Davis Miller & Mosher, LLP

[57] ABSTRACT

An asymmetric dioxazine compound represented by the following formula (I) in the free acid form:

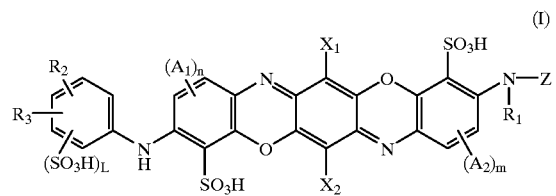

wherein $A_1$ and $A_2$ independently of one another are each sulfo, halo, alkyl or alkoxy, $X_1$ and $X_2$ independently of one another are each hydrogen, halo, alkyl, alkoxy or phenoxy, $R_1$ is hydrogen or unsubstituted or substituted alkyl, $R_2$ and $R_3$ independently of one another are each hydrogen, alkyl, alkoxy, halo or unsubstituted or substituted amino, Z is a fiber-reactive group, m and n independently of one another are each 0 or 1, provided that m≠n, and L is 1 or 2. This compound is suitable for dyeing and printing cellulose fiber, natural and synthetic polyamide fibers, polyurethane fiber, leather and the like and mixed yarns thereof, to obtain dyed or printed products of a color fast to light, wetness and chlorine with superior build-up and level dyeing properties.

10 Claims, No Drawings

ASYMMETRIC DIOXAZINE COMPOUNDS AND METHOD FOR DYEING OR PRINTING FIBER MATERIALS USING THE SAME

The present invention relates to asymmetric dioxazine compounds suitable for use in the dyeing and printing of materials containing hydroxyl group and/or amide group, particularly those such as cellulose fiber, natural and synthetic polyamide fibers, polyurethane fiber, leather and mixed yarns thereof, to obtain dyed or printed products of a color which is fast to light, wetness and chlorine.

There are known some reactive dyes having a dioxazine skeleton in their molecular structure. However, they are as yet insufficient in dye performances, such as level dyeing property, build-up property, dyeing rate and fastness properties, particularly such as chlorine fastness. Particularly, in case of dyeing or printing the hydroxyl group-containing fiber materials, fastness properties of dyed or printed products, particularly such as chlorine fastness, is not satisfactory. The present inventors have conducted extensive studies, and as a result, asymmetric dioxazine compounds capable of solving the above-mentioned problem have been found.

The present invention provides asymmetric dioxazine compounds represented by the following formula (I) in the free acid form:

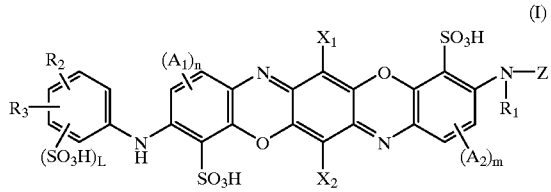

(I)

wherein $A_1$ and $A_2$ independently of one another are each sulfo, halo, alkyl or alkoxy, $X_1$ and $X_2$ independently of one another are each hydrogen, halo, alkyl, alkoxy or phenoxy, $R_1$ is hydrogen or unsubstituted or substituted alkyl, $R_2$ and $R_3$ independently of one another are each hydrogen, alkyl, alkoxy, halo or unsubstituted or substituted amino, Z is a fiber-reactive group, m and n independently of one another are each 0 or 1, provided that m≠n, and L is 1 or 2.

The present invention further provides a method for dyeing or printing fiber materials, which comprises using said asymmetric dioxazine compounds and a process for producing said asymmetric dioxazine compounds.

As to the symbols $A_1$ and $A_2$, the halo includes, for example, chloro and bromo, the alkoxy includes those of 1 to 4 carbon atoms such as methoxy and ethoxy, and the alkyl includes those of 1 to 4 carbon atoms such as methyl and ethyl. Among the groups represented by $A_1$ and $A_2$, sulfo is particularly preferable.

In the present invention, preferred are m=0, n=1 and $A_1$ bonds in the ortho-position with respect to the —NH— group.

The unsubstituted or substituted alkyl represented by $R_1$, includes those of 1 to 4 carbon atoms. Examples of the substituent of the alkyl are hydroxy, cyano, alkoxy, halo, carbamoyl, carboxy, alkoxycarbonyl, alkylcarbonyloxy, sulfo, sulfamoyl and the like.

Among the groups represented by $R_1$, hydrogen is particularly preferable.

As examples of the alkoxy, alkyl and halo represented by $R_2$ and $R_3$, $C_1$–$C_4$ alkoxy such as methoxy and ethoxy, $C_1$–$C_4$ alkyl such as methyl and ethyl, and halo such as chloro and bromo can be referred to, respectively.

Examples of the unsubstituted or substituted amino represented by $R_2$ and $R_3$, include —$NH_2$ and amino substituted once or twice by $C_1$–$C_4$ alkyl. Among them, —$NH_2$ is especially preferred.

As examples of the alkyl or alkoxy group represented by $X_1$ and $X_2$, $C_1$–$C_4$ alkyl groups and $C_1$–$C_4$ alkoxy groups can be referred to.

As the group represented by $X_1$ and $X_2$, the halo is particularly preferable, among which chloro and bromo are most preferable.

Among the asymmetric dioxazine compounds represented by the formula (I), a compound represented by the following formula (II) in the free acid form:

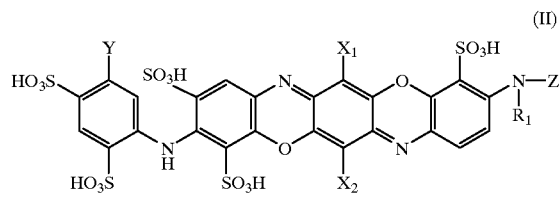

(II)

wherein Y is amino which is unsubstituted or substituted once or twice by $C_1$–$C_4$ alkyl, $X_1$, $X_2$, $R_1$ and Z are as defined above; is preferable from the viewpoint of the dye characteristics.

In the present invention, the fiber-reactive group represented by Z is intended to mean those which can react under dyeing or printing conditions with —OH, —NH— or —$NH_2$ group in the fibers to form a covalent bond.

More specifically, the fiber reactive group includes aromatic ones having at least one fiber reactive substituent on a 5- or 6-membered aromatic hetercyclic ring or a poly-condensed aromatic system, aliphatic ones and those formed by combination thereof through a suitable bridging group. The heterocyclic ring includes, for example, monoazines, diazines and triazines such as pyridine, pyrimidine, pyridazine, pyrazine, thiazine, oxazine, asymmetric or symmetric triazine and the like, and the poly-condensed aromatic system includes, for example, quinoline, phthalazine, cinnoline, quinazoline, quinoxaline, acridine, phenazine, phenanthridine and the like.

As the reactive substituent on the heterocyclic ring and the poly-condensed aromatic system, halo (Cl, Br or F), ammoniums including hydrazinium, sulfonium, sulfonyl, azide (—$N_3$), thiocyanato, thio, thioether, oxyether, sulfino, sulfo and the like can be referred to.

As the heterocyclic ring type and poly-condensed aromatic system fiber-reactive group, the followings can be referred to:

2,4-difluorotriazin-6-yl,
2,4-dichlorotriazin-6-yl,
monohalo-s-triazinyl groups and particularly monochlorotriazinyl and monofluorotriazinyl groups substituted by alkyl, aryl, amino, monoalkylamino, dialkylamino, aralkylamino, arylamino, alkoxy, aryloxy, alkylthio or arylthio, such as:
2-amino-4-fluorotriazin-6-yl,
2-methylamino-4-fluorotriazin-6-yl,
2-ethylamino-4-fluorotriazin-6-yl,
2-isopropylamino-4-fluorotriazin-6-yl,
2-dimethylamino-4-fluorotriazin-6-yl,
2-diethylamino-4-fluorotriazin-6-yl,
2-β-methoxyethylamino-4-fluorotriazin-6-yl,
2-β-hydroxyethylamino-4-fluorotriazin-6-yl,
2-di(β-hydroxyethylamino)-4-fluorotriazin-6-yl,
2-β-sulfoethylamino-4-fluorotriazin-6-yl,
2-β-sulfoethylmethylamino-4-fluorotriazin-6-yl,
2-carboxymethylamino-4-fluorotriazin-6-yl,
2-di(carboxymethylamino)-4-fluorotriazin-6-yl,
2-sulfomethylamino-4-fluorotriazin-6-yl, 2-β-cyanoethylamino-4-fluorotriazin-6-yl,
2-benzylamino-4-fluorotriazin-6-yl,
2-β-phenylethylamino-4-fluorotriazin-6-yl,
2-benzylmethylamino-4-fluorotriazin-6-yl,
2-(4'-sulfobenzyl)amino-4-fluorotriazin-6-yl,
2-cyclohexylamino-4-fluorotriazin-6-yl,
2-(o-, m- or p-methylphenyl)amino-4-fluorotriazin-6-yl,
2-(o-, m- or p-sulfophenyl)amino-4-fluorotriazin-6-yl,
2-(2',5'-disulfophenyl)amino-4-fluorotriazin-6-yl,
2-(o-, m- or p-chlorophenyl)amino-4-fluorotriazin-6-yl,
2-(o-, m- or p-methoxyphenyl)amino-4-fluorotriazin-6-yl,
2-(2'-methyl-4'-sulfophenyl)amino-4-fluorotriazin-6-yl,
2-(2'-methyl-5'-sulfophenyl)amino-4-fluorotriazin-6-yl,
2-(2'-chloro-4'-sulfophenyl)amino-4-fluorotriazin-6-yl,
2-(2'-chloro-5'-sulfophenyl)amino-4-fluorotriazin-6-yl,
2-(2'-methoxy-4'-sulfophenyl)amino-4-fluorotriazin-6-yl,
2-(o-, m- or p-carboxyphenyl)amino-4-fluorotriazin-6-yl,
2-(2',4'-disulfophenyl)amino-4-fluorotriazin-6-yl,
2-(3',5'-disulfophenyl)amino-4-fluorotriazin-6-yl,
2-(2'-carboxy-4'-sulfophenyl)amino-4-fluorotriazin-6-yl,
2-(2'-carboxy-5'-sulfophenyl)amino-4-fluorotriazin-6-yl,
2-(6'-sulfophenyl-2'-yl)amino-4-fluorotriazin-6-yl,
2-(4',8'-disulfonaphth-2'-yl)amino-4-fluorotriazin-6-yl,
2-(6',8'-disulfonaphth-2'-yl)amino-4-fluorotriazin-6-yl,
2-(N-methylphenyl)amino-4-fluorotriazin-6-yl,
2-(N-ethylphenyl)amino-4-fluorotriazin-6-yl,
2-(N-β-hydroxyethylphenyl)amino-4-fluorotriazin-6-yl,
2-(N-isopropylphenyl)amino-4-fluorotriazin-6-yl,
2-morpholino-4-fluorotriazin-6-yl,
2-piperidino-4-fluorotriazin-6-yl,
2-(4',6',8'-trisulfonaphth-2'-yl)-4-fluorotriazin-6-yl,
2-(3',6',8'-trisulfonaphth-2'-yl)-4-fluorotriazin-6-yl,
2-(3',6'-disulfonaphth-1'-yl)-4-fluorotriazin-6-yl,
N-methyl-N-(2,4-dichlorotriazin-6-yl)-carbamyl,
N-methyl-N-(2-methylamino-4-chlorotriazin-6-yl)-carbamyl,
N-methyl-N-(2-dimethylamino-4-chlorotriazin-6-yl)-carbamyl,
N-methyl- or N-ethyl-N-(2,4-dichlorotriazin-6-yl)-aminoacetyl,
2-methoxy-4-fluorotriazin-6-yl,
2-ethoxy-4-fluorotriazin-6-yl,
2-phenoxy-4-fluorotriazin-6-yl,
2-(o-, m- or p-sulfophenoxy)-4-fluorotriazin-6-yl,
2-(o-, m- or p-methyl or methoxyphenyl)-4-fluorotriazin-6-yl,
2-β-hydroxyethylmercapto-4-fluorotriazin-6-yl,
2-phenylmercapto-4-fluorotriazin-6-yl,
2-(4'-methylphenyl)mercapto-4-fluorotriazin-6-yl,
2-(2',4'-dinitrophenyl)mercapto-4-fluorotriazin-6-yl,
2-methyl-4-fluorotriazin-6-yl,
2-phenyl-4-fluorotriazin-6-yl; and the corresponding 4-chloro- and 4-bromo-triazinyl groups; and the corresponding groups obtained by a halogen interchange using a tertiary base such as trimethylamine, triethylamine, dimethyl-β-hydroxyethylamine, triethanolamine, N,N-dimethylhydrazine, pyridine, picoline, nicotinic acid or isonicotinic acid or sulfinic acid salts, particularly benzene-sulfinic acid or hydrogensulfites; and mono-, di- or tri-halopyrimidinyl groups such as:

2,4-dichloropyrimidin-6-yl,
2,4,5-trichloropyrimidin-6-yl,
2,4-dichloro-5-nitro- or -5-methyl- or -5-carboxymethyl- or -5-carboxy- or -5-cyano- or -5-vinyl- or -5-sulfo- or -5-mono-, di- or tri-chloromethyl;- or -5-carboalkoxy-pyrimidin-6-yl,
2,6-dichloropyrimidine-4-carbonyl,
2,4-dichloropyrimidine-5-carbonyl,
2-chloro-4-methylpyrimidine-5-carbonyl, 2-methyl-4-chloropyrimidine-5-carbonyl,
2-methylthio-4-fluoropyrimidine-5-carbonyl,
6-methyl-2,4-dichloropyrimidine-5-carbonyl,
2,4,6-trichloropyrimidine-5-carbonyl,
2,4-dichloropyrimidine-5-sulfonyl,
2-chloroquinoxaline-3-carbonyl,
2- or 3-monochloroquinoxaline-6-carbonyl,
2- or 3-monochloroquinoxaline-6-sulfonyl,
2,3-dichloroquinoxaline-6-carbonyl,
2,3-dichloroquinoxaline-6-sulfonyl,
1,4-dichlorophthalazine-6-sulfonyl or -6-carbonyl,
2,4-dichloroquinazoline-7- or -6-sulfonyl or -6-carbonyl,
2-, 3- or 4-(4',5'-dichloropyridaz-6'-on-1'-yl)-phenylsulfonyl or -carbonyl,
β-(4',5'-dichloropyridaz-6'-on-1'-yl)-ethylcarbonyl,
N-methyl-N-(2,3-dichloroquinoxaline-6-sulfonyl)aminoacetyl,
N-methyl-N-(2,3-dichloroquinoxaline-6-carbonyl)aminoacetyl; and the corresponding bromine and fluorine derivative of the above-mentioned chlorine-substituted heterocyclic groups, such as:

2-fluoro-4-pyrimidinyl,
2,6-difluoro-4-pyrimidinyl,
2,6-difluoro-5-chloro-4-pyrimidinyl,
2-fluoro-5,6-dichloro-4-pyrimidinyl,
2,6-difluoro-5-methyl-4-pyrimidinyl,
2-fluoro-5-methyl-6-chloro-4-pyrimidinyl,
2-fluoro-5-nitro-6-chloro-4-pyrimidinyl,
5-bromo-2-fluoro-4-pyrimidinyl,
2-fluoro-5-cyano-4-pyrimidinyl,
2-fluoro-5-methyl-4-pyrimidinyl,
2,5,6-trifluoro-4-pyrimidinyl,
5-chloro-6-chloromethyl-2-fluoro-4-pyrimidinyl,
5-chloro-6-dichloromethyl-2-fluoro-4-pyrimidinyl,
5-chloro-6-trichloromethyl-2-fluoro-4-pyrimidinyl,
5-chloro-2-chloromethyl-6-fluoro-4-pyrimidinyl,
5-chloro-2-dichloromethyl-6-fluoro-4-pyrimidinyl,
5-chloro-2-trichloromethyl-6-fluoro-4-pyrimidinyl,
5-chloro-2-fluorodichloromethyl-6-fluoro-4-pyrimidinyl,
2,6-difluoro-5-bromo-4-pyrimidinyl,
2-fluoro-5-bromo-6-methyl-4-pyrimidinyl,
2-fluoro-5-bromo-6-chloromethyl-4-pyrimidinyl,
2,6-difluoro-5-chloromethyl-4-pyrimidinyl,
2,6-difluoro-5-nitro-4-pyrimidinyl,
2-fluoro-6-methyl-4-pyrimidinyl,
2-fluoro-5-chloro-6-methyl-4-pyrimidinyl,
2-fluoro-5-chloro-4-pyrimidinyl,
2-fluoro-6-chloro-4-pyrimidinyl,
6-trifluoromethyl-5-chloro-2-fluoro-4-pyrimidinyl,
6-trifluoromethyl-2-fluoro-4-pyrimidinyl,
2-fluoro-5-nitro-4-pyrimidinyl,
2-fluoro-5-trifluoromethyl-4-pyrimidinyl,
2-fluoro-5-phenyl- or -5-methylsulfonylmethyl-4-pyrimidinyl,
2-fluoro-5-carboxamido-4-pyrimidinyl,
2-fluoro-5-carbomethoxy-4-pyrimidinyl,
2-fluoro-5-bromo-6-trifluoromethyl-4-pyrimidinyl,
2-fluoro-6-carboxamido-4-pyrimidinyl,
2-fluoro-6-carbomethoxy-4-pyrimidinyl, 2-fluoro-6-phenyl-4-pyrimidinyl,
2-fluoro-6-cyano-4-pyrimidinyl,
2-fluoro-4-dichloromethyl-5-chloropyrimidin-6-yl,
2-fluoro-5-chloropyrimidin-4-yl,
2-methyl-4-fluoro-5-methylsulfonylpyrimidinyl-6-yl,
2,6-difluoro-5-methylsulfonyl-4-pyrimidinyl,
2,6-dichloro-5-methylsulfonyl-4-pyrimidinyl,
2-fluoro-5-sulfonamido-4-pyrimidinyl,
2-fluoro-5-chloro-6-carbomethoxy-4-pyrimidinyl,
2,6-difluoro-5-trifluoromethyl-4-pyrimidinyl; and
sulfonyl-containing triazine groups such as:
2,4-bis(phenylsulfonyl)triazin-6-yl,
2-(3'-carboxyphenyl)sulfonyl-4-chlorotriazin-6-yl,
2-(3'-sulfophenyl)sulfonyl-4-chlorotriazin-6-yl,
2,4-bis(3'-carboxyphenylsulfonyl)triazin-6-yl; and
sulfonyl-containing pyrimidine rings, such as:
2-carboxymethylsulfonyl-pyrimidin-4-yl,
2-methylsulfonyl-6-methylpyrimidin-4-yl,
2-methylsulfonyl-6-ethylpyrimidin-4-yl,
2-phenylsulfonyl-5-chloro-6-methyl-pyrimidin-4-yl,
2,6-bis-methylsulfonyl-pyrimidin-4-yl,
2,6-bis-methylsulfonyl-5-chloro-pyrimidin-4-yl,
2,4-bis-methylsulfonyl-pyrimidine-5-sulfonyl,
2-methylsulfonyl-pyrimidin-4-yl,
2-phenylsulfonyl-pyrimidin-4-yl,
2-trichloromethylsulfonyl-6-methyl-pyrimidin-4-yl,
2-methylsulfonyl-5-chloro-6-methyl-pyrimidin-4-yl,
2-methylsulfonyl-5-bromo-6-methyl-pyrimidin-4-yl,
2-methylsulfonyl-5-chloro-6-ethyl-pyrimidin-4-yl,
2-methylsulfonyl-5-chloro-6-chloromethyl-pyrimidin-4-yl,
2-methylsulfonyl-4-chloro-6-methylpyrimidine-5-sulfonyl,
2-methylsulfonyl-5-nitro-6-methylpyrimidin-4-yl,
2,5,6-tris-methylsulfonyl-pyrimidin-4-yl,
2-methylsulfonyl-5,6-dimethyl-pyrimidin-4-yl,
2-ethylsulfonyl-5-chloro-6-methyl-pyrimidin-4-yl,
2-methylsulfonyl-6-chloropyrimidin-4-yl,
2,6-bis-methylsulfonyl-5-chloro-pyrimidin-4-yl,
2-methylsulfonyl-6-carboxypyrimidin-4-yl,
2-methylsulfonyl-5-sulfopyrimidin-4-yl,
2-methylsulfonyl-6-carbomethoxypyrimidin-4-yl,
2-methylsulfonyl-5-carboxypyrimidin-4-yl,
2-methylsulfonyl-5-cyano-6-methoxypyrimidin-4-yl,
2-methylsulfonyl-5-chloropyrimidin-4-yl,
2-sulfoethylsulfonyl-6-methylpyrimidin-4-yl,
2-methylsulfonyl-5-bromopyrimidin-4-yl,
2-phenylsulfonyl-5-chloropyrimidin-4-yl,
2-carboxymethylsulfonyl-5-chloro-6-methylpyrimidin-4-yl,
2-methylsulfonyl-6-chloropyrimidine-4- or -5-carbonyl,
2,6-bis(methylsulfonyl)pyrimidine-4- or -5-carbonyl,
2-ethylsulfonyl-6-chloropyrimidine-5-sulfonyl,
2,4-bis(methylsulfonyl)pyrimidine-5-sulfonyl,
2-methylsulfonyl-4-chloro-6-methylpyrimidine-5-sulfonyl or -carbonyl,
2-chlorobenzothiazole-5- or -6-carbonyl or -5-or -6-sulfonyl;
2-arylsulfonyl- or -alkylsulfonylbenzothiazole-5- or -6-carbonyl or -sulfonyl, such as:
  2-phenylsulfonylbenzothiazole-5- or -6-carbonyl or -5- or -6-sulfonyl, and
  2-methylsulfonyl- or 2-ethylsulfonylbenzothiazole-5- or -6-sulfonyl or -5- or -6-carbonyl; and
the corresonponding 2-sulfonylbenzothiazole-5- or -6-carbonyl or -sulfonyl derivatives having sulfo group in their condensed benzene ring,
2-chlorobenzoxazole-5- or -6-carbonyl or -sulfonyl,
2-chlorobenzimidazole-5- or -6-carbonyl or -sulfonyl,
2-chloro-1-methylbenzimidazole-5- or -6-carbonyl or -sulfonyl,
2-chloro-4-methyl-1,3-thiazole-5-carbonyl or -4- or -5-sulfonyl,
4-chloro or 4-nitro-quinoline-5-carbonyl N-oxide, and the like.

As examples of the aliphatic fiber-reactive group, the followings can be referred to:
acryloyl;
mono-, di- and tri-chloroacryloyls such as:
  —CO—CH=CH—Cl,
  —CO—CCl=CH$_2$,
  —CO—CCl=CH—CH$_3$,
  —CO—CCl=CH—COOH,
  —CO—CH=CCl—COOH;
β-chloropropionyl,
3-phenylsulfonylpropionyl,
3-methylsulfonylpropionyl,
2-fluoro-2-chloro-3,3-difluorocyclobutane-1-carbonyl,
2,2,3,3-tetrafluorocyclobutane-1-carbonyl or -1-sulfonyl,
β-(2,2,3,3-tetrafluorocyclobutyl)aryloxy,
α- or β-bromoacryloyl,
α- or β-alkyl- or aryl-sulfoacryloyl groups such as:
  α- or β-methylsulfonylacryloyl,
  chloroacetyl,
  vinylsulfonyl,
  —SO$_2$CH$_2$CH$_2$Z$_1$ (Z$_1$ represents a group capable of being split by the action of alkali), and the like.

Preferable fiber-reactive groups represented by Z are those represented by the following formulas (III) to (V):

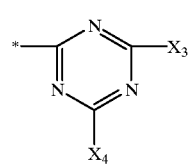
(III)

wherein X$_3$ and X$_4$ independently represent chloro, fluoro,

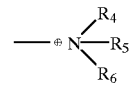

(R$_4$, R$_5$ and R$_6$ represent an unsubstitued or substituted alkyl group) or

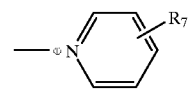

(R$_7$ is a hydrogen, cyano, carbamoyl, halo, carboxy, sulfo, hydroxy, vinyl or, unsubstituted or substituted alkyl and the mark * represents a bond linking to

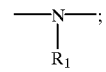

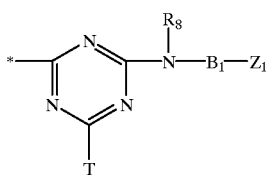
(IV)

wherein $B_1$ is an unsubstituted or substituted phenylene, alkylene or naphthylene group, or $-(CH_2)_p-Q-(CH_2)_q-$ wherein p and q are each independently 2, 3 or 4, and Q is $-O-$ or $-NR-$ in which R is hydrogen or $C_1-C_4$ alkyl, $R_8$ is hydrogen or unsubstituted or substituted alkyl, $Z_1$ represents $-SO_2CH=CH_2$ or $-SO_2CH_2CH_2Y_1$ ($Y_1$ is a group capable of being split by the action of an alkali), T represents halo, alkoxy,

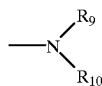

($R_9$ and $R_{10}$ independently of one another are each hydrogen, $C_5-C_7$ cycloalkyl or an unsubstituted or substituted alkyl, phenyl, naphthyl or benzyl group, provided that $R^9$ and $R^{10}$ can be taken together with each other to form a 5- or 6-membered ring which may contain $-O-$ or $-NH-$),

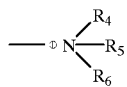

($R_4$, $R_5$ and $R_6$ are as defined above),

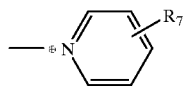

($R_7$ is as defined above) or

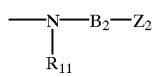

[$B_2$ is an unsubstituted or substituted phenylene, alkylene or naphthylene group, or $-(CH_2)_p-Q-(CH_2)_q-$ wherein p and q are each independently 2, 3 or 4, and Q is $-O-$ or $-NR-$ in which R is hydrogen or $C_1-C_4$ alkyl, $R_{11}$ is hydrogen or unsubstituted or substituted alkyl and $Z_2$ is $-SO_2CH=CH_2$ or $-SO_2CH_2CH_2Y_2$ ($Y_2$ is a group capable of being split by the action of an alkali)] and the mark * is as defined above;

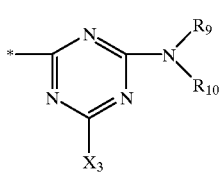
(V)

wherein $X_3$, $R_9$, $R_{10}$ and the mark * are as defined above.

As the fiber-reactive group represented by Z, groups represented by the following formula (VI) are particularly preferable from the viewpoint of dyeing performances:

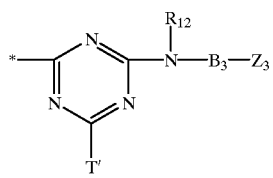
(VI)

wherein $B_3$ is an unsubstituted or substituted phenylene, alkylene or naphthylene group, or $-(CH_2)_p-Q-(CH_2)_q-$ wherein p and q are each independently 2, 3 or 4, and Q is $-O-$ or $-NR-$ in which R is hydrogen or $C_1-C_4$ alkyl, $R_{12}$ represents hydrogen or unsubstituted or substituted alkyl and $Z_3$ represents $-SO_2CH=CH_2$ or $-SO_2CH_2CH_2Y_3$ ($Y_3$ is a group capable of being split by the action of an alkali) and T' represents chloro, fluoro, alkoxy,

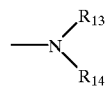

($R_{13}$ represents hydrogen or unsubstituted or substituted alkyl and $R_{14}$ represents hydrogen or an unsubstituted or substituted alkyl, phenyl or naphthyl group),

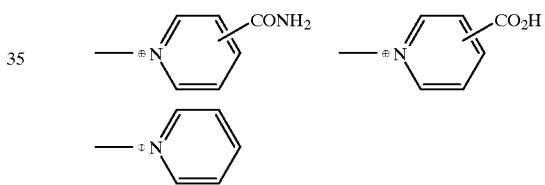

or

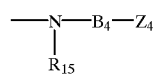

($B_4$ represents an unsubstituted or substituted phenylene, alkylene or naphthylene group, or $-(CH_2)_p-Q-(CH_2)_q-$ wherein p and q are each independently 2, 3 or 4, and Q is $-O-$ or $-NR-$ in which R is hydrogen or $C_1-C_4$ alkyl, $R_{15}$ is hydrogen or unsubstituted or substituted alkyl, $Z_4$ is $-SO_2CH=CH_2$ or $-SO_2CH_2CH_2Y_4$ ($Y_4$ is a group capable of being split by the action of an alkali) and the mark * is as defined above.

As preferable examples of the unsubstituted or substituted alkylene group and $-(CH_2)_p-Q-(CH_2)_q-$ wherein p, q and Q are as defined above, represented by $B_1$, $B_2$, $B_3$ and $B_4$, $-(CH_2)_2-$, $-(CH_2)_3-$, $-(CH_2)_2O(CH_2)_2-$ and the like can be referred to. As said unsubstituted or substituted phenylene or naphthylene group, phenylene groups unsubstituted or substituted once or twice by substituent(s) selected from the group consisting of methyl, ethyl, methoxy, ethoxy, chloro, bromo and sulfo, and naphthylene groups unsubstituted or substituted once by sulfo are preferable, of which concrete examples include the followings:

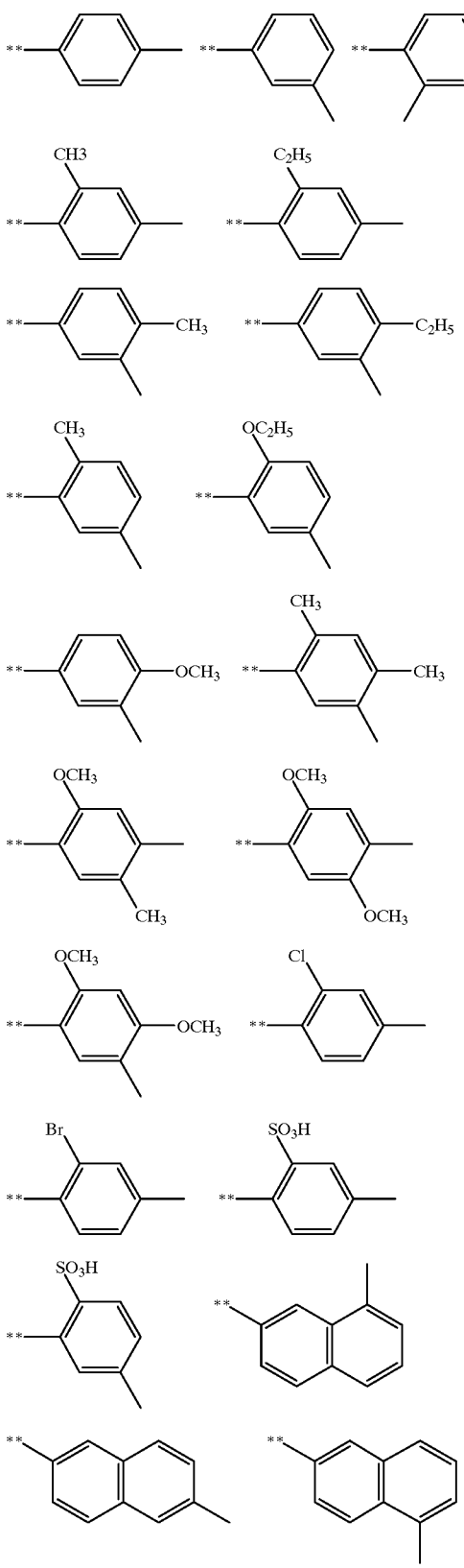

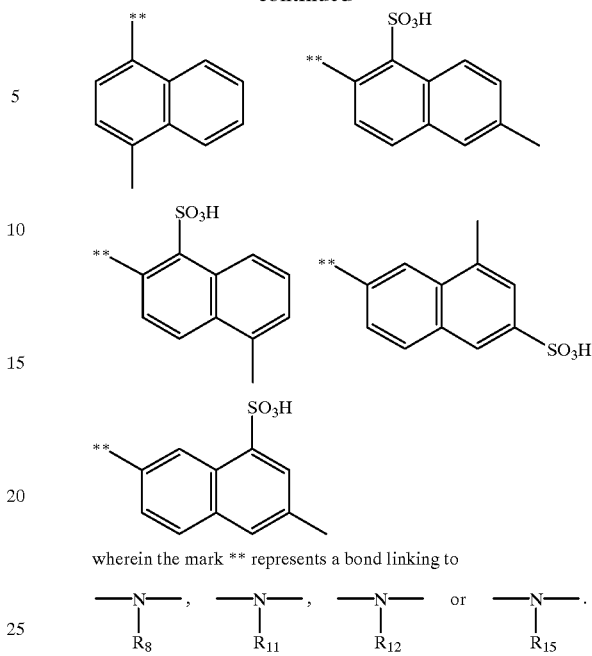

wherein the mark ** represents a bond linking to $$-\underset{R_8}{\overset{}{N}}-,\quad -\underset{R_{11}}{\overset{}{N}}-,\quad -\underset{R_{12}}{\overset{}{N}}-\quad \text{or}\quad -\underset{R_{15}}{\overset{}{N}}-.$$

As examples of the group capable of being split by the action of an alkali represented by $Y_1$, $Y_2$, $Y_3$ and $Y_4$, sulfuric ester group, thiosulfuric ester group, phosphoric ester group, acetic ester group, halogen and the like can be referred to, among which sulfuric ester group is most preferable.

As examples of the unsubstituted or substituted alkyl group represented by $R_8$, $R_{11}$, $R_{12}$ and $R_{15}$, alkyl groups having 1 to 4 carbon atoms unsubstituted or substituted once or twice by a substitutent selected from hydroxy, cyano, $C_1$–$C_4$ alkoxy, halo, carboxy, carbamoyl, $C_1$–$C_4$ alkoxycarbonyl, $C_1$–$C_4$ alkylcarbonyloxy, sulfo and sulfamoyl can be referred to. Among them, preferable are a $C_1$–$C_4$ alkyl group such as methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl. As $R_8$, $R_{11}$, $R_{12}$ and $R_{15}$, hydrogen, methyl and ethyl are particularly preferable.

As preferable examples of the unsubstituted or substituted alkyl group represented by $R_9$, $R_{10}$, $R_{13}$ and $R_{14}$, alkyl groups having 1 to 4 carbon atoms unsubstituted or substituted once or twice by a member selected from the group consisting of alkoxy groups having 1 to 4 carbon atoms, sulfo group, carboxy group, hydroxy group, chloro, phenyl group and sulfato group can be referred to.

Among them, particularly preferable are methyl, ethyl, n-propyl, isopropyl, n-butyl, isobutyl, sec-butyl, β-hydroxyethyl, β-sulfatoethyl, β-sulfoethyl, β-methoxyethyl, β-carboxyethyl and the like.

As preferable examples of the unsubstituted or substituted phenyl group represented by $R_9$, $R_{10}$ and $R_{14}$, phenyl groups unsubstituted or substituted once or twice by a member selected from the group consisting of alkyl groups having 1 to 4 carbon atoms, alkoxy groups having 1 to 4 carbon atoms, sulfo group, carboxy group, chloro and bromo can be referred to.

Among them, phenyl, 2-, 3- or 4-sulfophenyl, 2,4- or 2,5-disulfonphenyl, 2-, 3- or 4-carboxyphenyl, 2-, 3- or 4-chlorophenyl, 2-, 3- or 4-methylphenyl and 2-, 3- or 4-methoxyphenyl and the like are particularly preferable.

As preferable examples of the unsubstituted or substituted naphthyl group represented by $R_9$, $R_{10}$ and $R_{14}$, naphthyl groups unsubstituted or substituted once, twice or three times by a member selected from the group consisting of hydroxy, carboxy, sulfo, alkyl having 1 to 4 carbon atoms, alkoxy having 1 to 4 carbon atoms and chloro can be referred to.

Among them, particularly preferable are 2-, 3-, 4-, 5-, 6-, 7- or 8-sulfo-1-naphthyl, 1-, 5-, 6-, 7- or 8-sulfo-2-naphthyl, 1,5-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl and the like.

As preferable examples of the unsubstituted or substituted benzyl represented by $R_9$ and $R_{10}$, benzyl groups unsubstituted or substituted once or twice by a member selected from the group consisting of alkyl having 1 to 4 carbon atoms, alkoxy having 1 to 4 carbon atoms, sulfo and chloro can be referred to.

Among them, benzyl, 2-, 3- or 4-sulfobenzyl and the like are particularly preferable.

In the present invention, a case in which one of $R_9$ and $R_{10}$ is hydrogen, methyl or ethyl and the other of them is a phenyl group unsubstituted or substituted by $C_1$–$C_4$ alkyl, $C_1$–$C_4$ alkoxy, sulfo, carboxy or halo or a $C_1$–$C_4$ alkyl group unsubstituted or substituted by alkoxy, sulfo, carboxy, hydroxy, chloro or sulfato and a case in which $R_9$ and $R_{10}$ both are hydrogen atoms are preferable from the viewpoint of dye characteristics. Regarding $R_{13}$ and $R_{14}$, too, the same combinations as in $R_9$ and $R_{10}$ are preferable from the viewpoint of dye characteristics.

As examples of compounds represented by $HNR_9R_{10}$ and $HNR_{13}R_{14}$ which can be used to form the groups

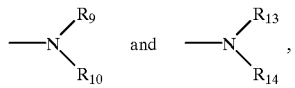

respectively, in the above formulas (IV), (V) and (VI) include the followings:
 ammonia;
 aromatic amines such as:
  1-aminobenzene,
  1-amino-2-, -3- or -4-methylbenzene,
  1-amino-3,4- or 3,5-dimethylbenzene,
  1-amino-2-, -3- or -4-ethylbenzene,
  1-amino-2-, -3- or -4-methoxybenzene,
  1-amino-2-, -3- or -4-ethoxybenzene,
  1-amino-2-, -3- or -4-chlorobenzene,
  3- or 4-aminophenylmethanesulfonic acid,
  2-, 3- or 4-aminobenzenesulfonic acid,
  3-methylaminobenzenesulfonic acid,
  3-ethylaminobenzenesulfonic acid,
  4-methylaminobenzenesulfonic acid,
  4-ethylaminobenzenesulfonic acid,
  5-aminobenzene-1,3-disulfonic acid,
  6-aminobenzene-1,3-disulfonic acid,
  6-aminobenzene-1,4-disulfonic acid,
  4-aminobenzene-1,2-disulfonic acid,
  4-amino-5-methylbenzene-1,2-disulfonic acid,
  2-, 3- or 4-aminobenzoic acid,
  5-aminobenzene-1,3-dicarboxylic acid,
  5-amino-2-hydroxybenzenesulfonic acid,
  4-amino-2-hydroxybenzenesulfonic acid,
  5-amino-2-ethoxybenzenesulfonic acid,
  N-methylaminobenzene,
  N-ethylaminobenzene,
  1-methylamino-3- or -4-methylbenzene,
  1-ethylamino-4-chlorobenzene,
  1-ethylamino-3- or -4-methylbenzene,
  1-(2-hydroxyethyl)amino-3-methylbenzene,
  3- or 4-methylaminobenzoic acid,
  3- or 4-methylaminobenzenesulfonic acid,
  2-aminonaphthalene-1-sulfonic acid,
  4-aminonaphthalene-1-sulfonic acid,
  5-aminonaphthalene-1-sulfonic acid,
  6-aminonaphthalene-1-sulfonic acid,
  7-aminonaphthalene-1-sulfonic acid,
  8-aminonaphthalene-1-sulfonic acid,
  1-aminonaphthalene-2-sulfonic acid,
  4-aminonaphthalene-2-sulfonic acid,
  5-aminonaphthalene-2-sulfonic acid,
  6-aminonaphthalene-2-sulfonic acid,
  7-aminonaphthalene-2-sulfonic acid,
  7-methylaminonaphthalene-2-sulfonic acid,
  7-ethylaminonaphthalene-2-sulfonic acid,
  7-butylaminonaphthalene-2-sulfonic acid,
  7-isobutylaminonaphthalene-2-sulfonic acid,
  8-aminonaphthalene-2-sulfonic acid,
  4-aminonaphthalene-1,3-disulfonic acid,
  5-aminonaphthalene-1,3-disulfonic acid,
  6-aminonaphthalene-1,3-disulfonic acid,
  7-aminonaphthalene-1,3-disulfonic acid,
  8-aminonaphthalene-1,3-disulfonic acid,
  2-aminonaphthalene-1,5-disulfonic acid,
  3-aminonaphthalene-1,5-disulfonic acid,
  4-aminonaphthalene-1,5-disulfonic acid,
  4-aminonaphthalene-1,6-disulfonic acid,
  8-aminonaphthalene-1,6-disulfonic acid,
  4-aminonaphthalene-1,7-disulfonic acid,
  3-aminonaphthalene-2,6-disulfonic acid,
  4-aminonaphthalene-2,6-disulfonic acid,
  3-aminonaphthalene-2,7-disulfonic acid,
  4-aminonaphthalene-2,7-disulfonic acid,
  6-aminonaphthalene-1,3,5-trisulfonic acid,
  7-aminonaphthalene-1,3,5-trisulfonic acid,
  4-aminonaphthalene-1,3,6-trisulfonic acid,
  7-aminonaphthalene-1,3,6-trisulfonic acid,
  8-aminonaphthalene-1,3,6-trisulfonic acid, and
  4-aminonaphthalene-1,3,7-trisulfonic acid, and
 aliphatic amines such as:
  methylamine,
  ethylamine,
  n-propylamine,
  isopropylamine,
  n-butylamine,
  isobutylamine,
  sec-butylamine,
  dimethylamine,
  diethylamine,
  methylethylamine, allylamine,
2-chloroethylamine,
2-methoxyethylamine,
2-aminoethanol,
2-methylaminoethanol,
bis-(2-hydroxyethyl)amine,
2-acetylaminoethylamine,
1-amino-2-propanol,
3-methoxypropylamine,
1-amino-3-dimethylaminopropane,
2-aminoethanesulfonic acid,
aminomethanesulfonic acid,
2-methylaminoethanesulfonic acid,
3-amino-1-propanesulfonic acid,
2-sulfatoethylamine,
aminoacetic acid,
methylaminoacetic acid,
ε-aminocaproic acid,
benzylamine,
2-, 3- or 4-chlorobenzylamine,
4-methylbenzylamine,
N-methylbenzylamine,
2-, 3- or 4-sulfobenzylamine,
2-phenylethylamine,
1-phenylethylamine,
1-phenyl-2-propylamine,
morpholine,
piperidine,
pyrrolidine, and
cyclohexylamine.

Among them, particularly preferable are ammonia, ethylamine, taurine, N-methyltaurine, morpholine, methylamine, n-propylamine, monoethanolamine, β-alanine, 2-chloroethylamine, 2-sulfatoethylamine, aniline, aniline-2-, -3- or -4-sulfonic acid, 2-, 3- or 4-carboxyaniline, N-methylaniline, N-ethylaniline, N-ethyl-2-, -3- or -4-chloroaniline, aniline-2,4- or -2,5-disulfonic acid, 2-, 3- or 4-chloroaniline, 2-, 3-or 4-methylaniline, 3- or 4-methylaminobenzenesulfonic acid, and the like.

In the formulas (III), (IV) and (V), preferable examples of the unsubstituted or substituted alkyl group represented by $R_4$, $R_5$ and $R_6$ include alkenyl groups such as allyl; alkyl groups such as lower alkyl groups (for example, methyl, ethyl, propyl, butyl); and substituted alkyl groups, for example, substituted lower alkyl groups such as hydroxy lower alkyl groups (for example, hydroxyethyl and hydroxypropyl), alkoxy lower alkyl groups (for example, methoxyethyl and ethoxyethyl), aryl-substituted lower alkyl groups (for example, benzyl, β-phenylethyl), substituted amino lower alkyl groups (for example, β-dimethylaminoethyl, γ-dimethylaminopropyl, γ-diethylaminopropyl), and carboxy lower alkyl groups (for example, carboxymethyl, carboxyethyl). Among them, lower alkyl groups are preferable, and methyl group is particularly preferable.

As examples of the unsubstituted or substituted alkyl group represented by $R_7$, $C_1$–$C_4$ alkyl groups unsubstituted or substituted by hydroxy group and cyano group can be referred to.

As the group represented by $R_7$, hydrogen, carboxy and carbamoyl are preferable, and carboxy is particularly preferable.

As the alkoxy groups represented by T and T', $C_1$–$C_4$ alkoxy groups can be referred to and methoxy and ethoxy are particularly preferable.

The compound of the present invention may be in the form of a free acid. Preferably, however, it is in the form of an alkali metal salt or an alkaline earth metal salt, for example, sodium salt and potassium salt.

The compound (I) of the present invention or salts thereof can be produced, for example, by allowing condensation reaction between an asymmetric dioxazine intermediate represented by the following formula (VII):

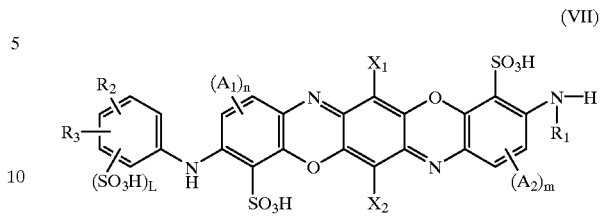

wherein $R_1$, $R_2$, $R_3$, $X_1$, $X_2$, $A_1$, $A_2$, m, n and L are as defined above, and a compound represented by the following formula (VIII):

$$X-Z \quad (VIII)$$

wherein X is a leaving group such as halo and Z is as defined above. The condensation reaction can be carried out in the presence of an acid binding agent.

The asymmetric dioxazine intermediate represented by formula (VII) can be synthesized according to methods well known in themselves. For example, it can be synthesized in the following manner.

An asymmetric dianilide compound represented by the following formula (IX):

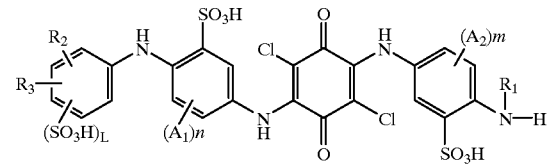

wherein $A_1$, $A_2$, $R_1$, $R_2$, $R_3$, m, n and L are as defined above, is synthesized by a condensation reaction between a corresponding aniline compound and chloranil. Then, the asymmetric dianilide compound is cyclized, optionally in the presence of an oxidant, to form an asymmetric dioxazine intermediate of the formula (VII).

The compound of the present invention has a fiber-reactive group and can be used for dyeing or printing a hydroxy group- or carbonamide group-containing material. Preferably, the material to be dyed or printed is used in the form of a fiber material or a mixed woven material thereof.

Said hydroxy group-containing material includes natural and synthetic hydroxy group-containing materials such as cellulose fiber materials, their regenerated products and polyvinyl alcohol. As the cellulose fiber material, cotton and other plant fibers such as linen, flax, jute and ramie fibers are preferable. As the regenerated cellulose fiber, viscose staple and filament viscose can be referred to.

Said carbonamide group-containing material includes synthetic and natural polyamides and polyurethanes. Particularly in the form of a fiber, it includes wool and other animal furs, silk, leather, polyamide-6,6, polyamide-6, polyamide-11 and polyamide-4.

The compound (I) of the present invention can be effectively used for dyeing or printing said materials, particularly those such as fiber materials in a manner depending on physical and chemical properties of the materials.

For example, the exhaustion dyeing method can be carried out at a temperature not exceeding 100° C. in the presence of a neutral salt such as sodium sulfate and sodium chloride, and an acid binding agent such as sodium carbonate, sodium tertiary phosphate, sodium hydroxide, sodium bicarbonate and the like optionally together with dissolving assistants, penetrants or level dyeing agents. The neutral salt which can be used for promoting the exhaustion of the dye may be added in portions, if desired.

The padding method can be carried out by padding the cellulose fibers at room or elevated temperature, followed by drying and then steaming or dry-heating the padded materials to perform dye-fixation.

The printing of cellulose fibers can be carried out in a one-phase or two-phase manner. The one-phase printing may be conducted by printing the fiber materials with a printing paste containing an acid binding agent such as sodium bicarbonate and the like, followed by steaming at a temperature of 95° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as starch ether is used optionally together with a conventional printing assistant such as urea and/or a dispersant.

As examples of the acid binding agent suitable for fixing the compound of this invention onto cellulose fiber, water-soluble basic salts formed between an alkali metal or an alkaline earth metal and an inorganic or organic acid or a compound liberating alkali in a heated state can be referred to. Particularly, alkali metal salts formed between an alkali metal hydroxide and an inorganic or organic acid of weak or medium strength are preferable, among which sodium salts and potassium salts are most preferable. Examples of such acid binding agent include sodium hydroxide, potassium hydroxide, sodium bicarbonate, sodium carbonate, sodium formate, potassium carbonate, sodium primary, secondary and tertiary phosphates, sodium silicate, sodium trichloroacetate and the like.

The dyeing of synthetic and natural polyamide and polyurethane fibers can be carried out by performing exhaustion in an acid or weak acid bath at a controlled pH value and then making the bath neutral or in some cases alkaline to perform fixation. The dyeing temperature ranges usually from 60° to 120° C. In order to achieve a level dyeing, there may be used a conventional level dyeing agent such as a condensation product between cyanuric chloride and 3 times by mole of aminobenzenesulfonic acid or aminonaphthalenesulfonic acid or an addition product between stearylamine and ethylene oxide.

The compound of the present invention is characterized in that it exhibits excellent performances in dyeing and printing fiber materials. It is particularly useful for dyeing cellulose fiber materials, and gives a dyed product excellent in light fastness, perspiration-light fastness, wet fastnesses such as washing resistance, peroxide-washing resistance, perspiration resistance, acid hydrolysis resistance and alkali hydrolysis resistance, and particularly in chlorine fastness, abrasion fastness and iron fastness.

It is further characterized by excellency in build-up, level-dyeing and wash-off properties and high solubility as well as high exhaustion and fixation percentages. Moreover, it is characterized in that it is hardly affected by changes in dyeing temperature, the amounts of neutral salts or acid binding agents and dyeing bath ratio, so that a dyed product with a stable quality can be obtained.

Moreover, the compound of the present invention is characterized in that it is resistant to color change at the time of the fixing treatment and resin treatment of dyed product and is resistant to the change due to contact with basic substances during storage.

The present invention will be illustrated in more detail by way of the following examples, wherein parts and % are by weight.

EXAMPLE 1

An asymmetric dioxazine intermediate (26.1 parts) represented by the following formula in the free acid form:

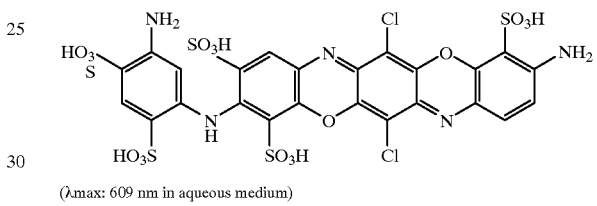

(λmax: 609 nm in aqueous medium)

was added to water (200 parts). Cyanuric chloride (5.5 parts) was added, and the mixture was stirred at a pH value of 5–6 at a temperature of 0–20° C. until the reaction was completed. Then, 1-aminobenzene-3-β-sulfatoethylsulfone (8.4 parts) was added and a reaction was carried out at a pH value of 2–6 at a temperature of 30–70° C. Thus, an asymmetric dioxazine compound represented by the following formula in the free acid form was obtained.

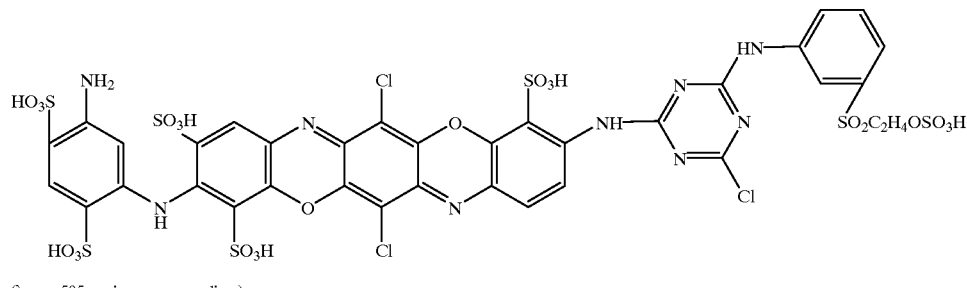

(λmax: 595 nm in aqueous medium)

EXAMPLE 2

Example 1 was repeated, except that the dioxazine intermediate, cyanuric chloride and 1-aminobenzene-3-β-sulfatoethylsulfone used in Example 1 were replaced with the compounds shown in Column 2, Column 3 and Column 4, respectively, of the following table to obtain the corresponding asymmetric dioxazine compounds. When used for dyeing, these compounds gave dyed products of which hues were as shown in Column 5 of the table.

| Run No. | Column 2 | Column 3 | Column 4 | Column 5 |
|---|---|---|---|---|
| 1 | [chromophore structure: dichloro-dioxazine with SO₃H, NH₂, and anilino(SO₃H,HO₃S) substituents] | [2,4,6-trichloropyrimidine] | [4-aminophenyl-SO₂C₂H₄OSO₃H] | Reddish blue |
| 2 | " | " | [3-(N-ethylamino)phenyl-SO₂C₂H₄OSO₃H] | " |
| 3 | " | " | [2-methoxy-5-(SO₂C₂H₄OSO₃H)-aniline] | " |
| 4 | [same chromophore as Run 1] | [cyanuric chloride / 2,4,6-trichlorotriazine] | NH₂C₂H₄OC₂H₄SO₂CH=CH₂ | Blue |
| 5 | " | [cyanuric chloride] | NH₂C₂H₄SO₂CH=CH₂ | Reddish blue |
| 6 | " | " | NH₂C₃H₆SO₂C₂H₄Cl | " |

-continued

| Run No. | Column 2 | Column 3 | Column 4 | Column 5 |
|---|---|---|---|---|
| 7 | [oxazine dye structure with NH₂, SO₃H groups, Cl, O, N substituents] | cyanuric chloride (2,4,6-trichloro-1,3,5-triazine) | 2-methoxy-5-amino-phenyl-SO₂C₂H₄OSO₃H | Reddish blue |
| 8 | " | " | 6-amino-naphthalen-2-yl-SO₂C₂H₄OSO₃H | " |
| 9 | " | 2,4,6-trifluoro-1,3,5-triazine | 3-amino-phenyl-SO₂C₂H₄OSO₃H | " |
| 10 | [oxazine dye structure same as above] | 2,4,6-trifluoro-1,3,5-triazine | NH₂C₂H₄OC₂H₄SO₂CH=CH₂ | Reddish blue |
| 11 | " | 2,4,6-trichloro-1,3,5-triazine | 3-amino-phenyl-SO₂CH=CH₂ | " |

-continued

| Run No. | Column 2 | Column 3 | Column 4 | Column 5 |
|---|---|---|---|---|
| 12 | (dioxazine structure with Br substituents) | " | (aniline-SO2C2H4OSO3H, meta) | " |
| 13 | (dioxazine structure with Cl substituents, CH3) | (dichlorotriazine) | (aniline-SO2C2H4OSO3H, meta) | Reddish blue |
| 14 | " | " | (aniline-SO2C2H4OSO3H, para) | " |
| 15 | (dioxazine structure with Cl substituents, Br) | " | (aniline-SO2C2H4OSO3H, meta) | " |
| 16 | (dioxazine structure with Cl substituents, Br) | (dichlorotriazine) | (NH-C2H4 aniline-SO2C2H4OSO3H, para) | Reddish blue |

-continued

| Run No. | Column 2 | Column 3 | Column 4 | Column 5 |
|---|---|---|---|---|
| 17 | [triphenodioxazine structure with NH2, SO3H, Cl, Br substituents] | " | [aniline with SO2C2H4OSO3H, meta NH2] | " |
| 18 | [triphenodioxazine structure with NH2, SO3H, Cl substituents] | " | " | " |
| 19 | [triphenodioxazine structure with NH2, SO3H, Cl substituents] | [dichlorotriazine] | [aniline with SO2C2H4OSO3H, NHC2H5] | Reddish blue |
| 20 | " | [difluorotriazine] | [aniline with SO2C2H4OSO3H, NH2] | " |

-continued

| Run No. | Column 2 | Column 3 | Column 4 | Column 5 |
|---|---|---|---|---|
| 21 | [triphenodioxazine structure with NH₂, SO₃H, HO₃S, Br, Cl substituents] | [dichlorotriazine] | [3-aminophenyl-SO₂C₂H₄OSO₃H] | " |
| 22 | [triphenodioxazine structure with NH₂, SO₃H, HO₃S, Cl substituents] | [dichlorotriazine] | [aminonaphthalene with SO₂C₂H₄OSO₃H and SO₃H] | Reddish blue |
| 23 | " | " | [2,5-dimethoxy-4-amino-phenyl-SO₂C₂H₄OSO₃H] | " |
| 24 | " | " | [3,5-bis(CONHC₃H₆SO₂C₂H₄OSO₃H)-aniline] | " |

-continued

| Run No. | Column 2 | Column 3 | Column 4 | Column 5 |
|---|---|---|---|---|
| 25 | [triphenodioxazine structure with Cl, SO₃H, NH₂, HO₃S substituents] | [dichlorotriazine] | 2,4-bis(CH₂SO₂C₂H₄OSO₃H)-aniline | Reddish blue |
| 26 | " | " | 4-aminobenzamide-CONHC₃H₆SO₂C₂H₄OSO₃H | " |
| 27 | " | [trifluorotriazine] | | " |
| 28 | [triphenodioxazine structure] | [dichlorotriazine] | NHCONHC₃H₆SO₂C₂H₄Cl substituted aniline; and diphenyl CONH with SO₂C₂H₄OSO₃H | Reddish blue |
| 29 | " | [difluorotriazine] | aminonaphthalene with SO₃H and SO₂C₂H₄OSO₃H | " |

-continued

| Run No. | Column 2 | Column 3 | Column 4 | Column 5 |
|---|---|---|---|---|
| 30 | " | (2,4,6-trichloro-1,3,5-triazine) | 4-aminophenyl-O-CH$_2$-CONH-phenyl-SO$_2$C$_2$H$_4$OSO$_3$H | " |
| 31 | (dioxazine chromophore with NH$_2$, SO$_3$H, Cl, SO$_3$H, NH, NH$_2$, SO$_3$H, HO$_3$S substituents) | (2,4,6-trichloro-1,3,5-triazine) | 7-amino-naphthalene with SO$_2$C$_2$H$_4$OSO$_3$H | Reddish blue |
| 32 | " | (2,4,6-trifluoro-1,3,5-triazine) | aminonaphthalene with SO$_3$H, SO$_3$H, SO$_2$C$_2$H$_4$OSO$_3$H | " |
| 33 | " | " | 3-aminophenyl-CONHC$_2$H$_4$SO$_2$C$_2$H$_4$OSO$_3$H | " |
| 34 | " | (2,4,6-trichloro-1,3,5-triazine) | aminophenyl with SO$_2$C$_2$H$_4$OSO$_3$H and CH$_2$SO$_2$C$_2$H$_4$OSO$_3$H | " |

EXAMPLE 3

The dioxazine intermediate used in Example 1 (26.1 parts) was added to water (200 parts). Cyanuric chloride (5.5 parts) was added and a condensation reaction was carried out at a pH of 5–6 at 0–20° C. Further, taurine (3.8 parts) was added and a condensation reaction was carried out. Then, to this reaction mixture was added 1-aminobenzene-3-β-sulfatoethylsulfone (8.4 parts) and a further condensation reaction was carried out at a pH of 2–7 at 30–70° C. to obtain an asymmetric dioxazine compound represented by the following formula in the free acid form.

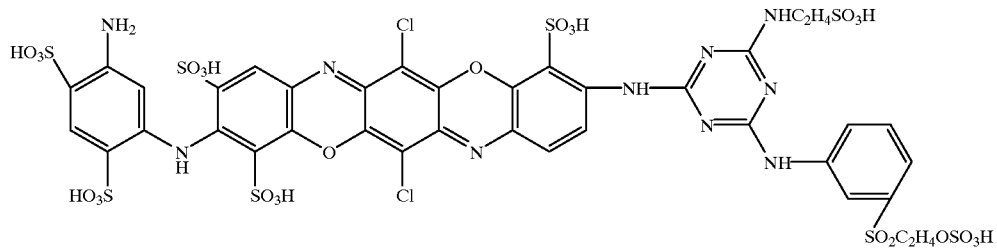

(λmax: 600 nm in aqueous medium)

EXAMPLE 4

Example 3 was repeated except that the dioxazine intermediate and 1-amino-3-β-sulfatoethylsulfone were replaced with the compounds shown in Column 2 and Column 4 in Example 2, respectively and taurine was replaced with each of the following 22 kinds of amines, respectively. Thus, corresponding asymmetric dioxazine compounds were obtained.

(1) N-methyltaurine
(2) Taurine
(3) Ammonia
(4) Ethylamine
(5) β-Alanine
(6) β-Hydroxyethylamine
(7) β-Sulfatoethylamine
(8) Diethanolamine
(9) Methylamine
(10) $NH_2C_2H_4OC_2H_4SO_2CH=CH_2$
(11) $NH_2C_2H_4OC_2H_4SO_2C_2H_4Cl$
(12) $NH_2C_3H_6SO_2C_2H_4Cl$
(13) $NH_2C_2H_4SO_2C_2H_4Cl$
(14) o-Aminobenzoic acid
(15) 1-Aminobenzene-2,5-disulfonic acid
(16) 1-Aminobenzene-2,4-disulfonic acid
(17) Diethylamine
(18) Dimethylamine
(19) Morpholine
(20) Pyperidine
(21) Cyclohexylamine
(22) Orthanilic acid

EXAMPLE 5

The asymmetric dioxazine compound obtained in Example 1 (38.1 parts) obtained in Example 1 was added to water (400 parts). After adding metanilic acid (5.2 parts) thereto, a condensation reaction was carried out at a pH of 2–7 at 30–80° C. to obtain an asymmetric oxazine compound represented by the following in the free acid form.

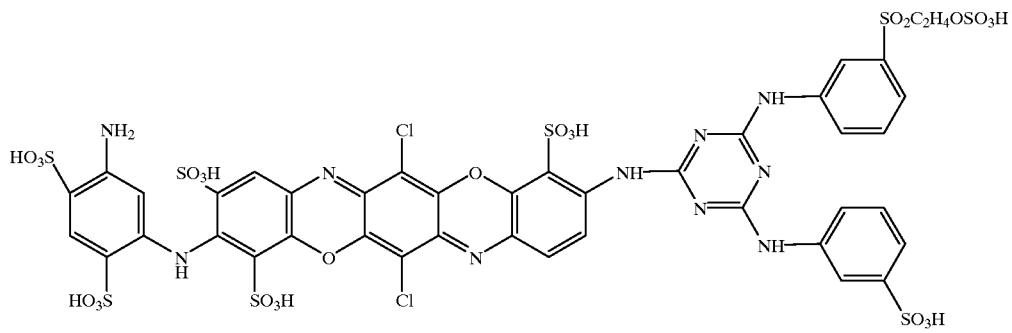

(λmax: 598 nm in aqueous medium)

EXAMPLE 6

Example 5 was repeated except that the asymmetric dioxazine compound, was replaced with each of the 34 kinds of the asymmetric dioxazine compounds obtained in Example 2 using each of the following 15 kinds of amines, respectively. Thus, corresponding asymmetric dioxazine compounds were obtained.
(1) Aniline
(2) Metanilic acid
(3) Sulfanilic acid
(4) 1-Aminonaphthalene-3,6-disulfonic acid
(5) 2-Aminonaphthalene-4,8-disulfonic acid
(6) 2-Aminonaphthalene-4,6,8-trisulfonic acid
(7) N-methylaniline
(8) N-ethylaniline
(9) m-Toluidine
(10) p-Toluidine
(11) m-Chloroaniline
(12) p-Anisidine
(13) p-Aminobenzoic acid
(14) 1-Aminobenzene-3-β-sulfatoethylsulfone
(15) 1-Aminobenzene-4-62 -sulfatoethylsulfone

EXAMPLE 7

Example 2 was repeated except that cyanuric chloride and cyanuric fluoride were replaced with an equimolar amount of each of the following 5 kinds of triazine compounds. Thus, corresponding asymmetric dioxazine compounds were obtained.

(1)
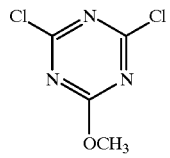

(2)
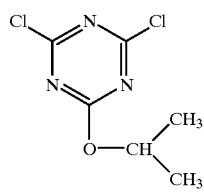

(3)
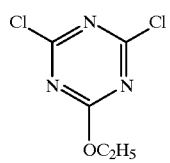

(4)
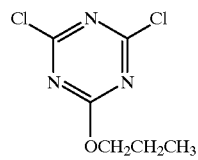

(5)
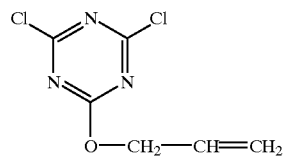

EXAMPLE 8

An asymmetric dioxazine intermediate (24.2 parts) represented by the following formula in the free acid form:

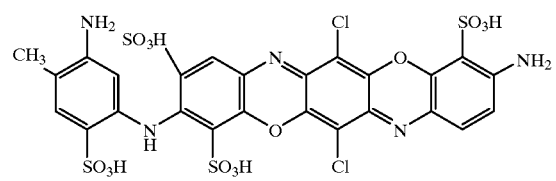

(λmax: 609 nm in aqueous medium)

was added to water (250 parts), to which was added cyanuric chloride (5.5 parts). The mixture was stirred at a pH of 4–6 at 0–20° C. until the reaction was completed. After the reaction, the reaction mixture was salted out with sodium chloride to obtain an asymmetric dioxazine compound represented by the following formula in the free acid form:

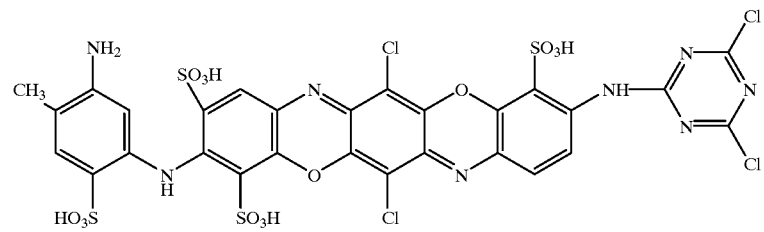

(λmax: 589 nm in aqueous medium)

EXAMPLE 9

Example 8 was repeated except that the dioxazine intermediate and cyanuric chloride were replaced with the compounds shown in Column 2 and Column 3 of the following table, respectively. Thus, corresponding asymmetric dioxazine compounds were obtained. When used for dyeing, these compounds gave dyed products of which hues were as shown in Column 4 of the table.

| Run No. | Column 2 | Column 3 | Column 4 |
|---|---|---|---|
| 1 | dioxazine structure with NH₂, HO₃S, SO₃H, Cl substituents | cyanuric chloride (2,4,6-trichloro-1,3,5-triazine) | Reddish blue |
| 2 | " | 2,4,6-trifluoro-1,3,5-triazine | " |
| 3 | " | 5-chloro-2,4,6-trifluoropyrimidine | " |
| 4 | dioxazine structure with NH₂, HO₃S, SO₃H, Cl substituents | 5-chloro-2,4-difluoro-6-methylpyrimidine | Reddish blue |
| 5 | dioxazine structure with NH₂, SO₃H, Cl substituents | 2,4,5,6-tetrachloropyrimidine | " |
| 6 | dioxazine structure with NH₂, SO₃H, Br substituents | cyanuric chloride | " |
| 7 | dioxazine structure with NH₂, SO₃H, Br substituents | 5-chloro-2,4,6-trifluoropyrimidine | Reddish blue |

-continued

| Run No. | Column 2 | Column 3 | Column 4 |
|---|---|---|---|
| 8 | [dioxazine structure with NH2, SO3H, Cl, O, N substituents] | [5-chloro-4,6-difluoropyrimidine structure] | " |
| 9 | " | [quinoxaline with ClOC- and two Cl substituents] | " |
| 10 | " | [pyrimidine with F, Cl, CN, Cl substituents] | " |

EXAMPLE 10

Example 1 was repeated except that the dioxazine intermediate, cyanuric chloride and 1-aminobenzene-3-β-sulfatosulfone used in Example 1 were replaced with the compounds shown in Column 2, Column 3 and Column 4 of the following table, respectively. Thus, corresponding asymmetric dioxazine compounds were obtained. When used for dyeing, these compounds gave dyed products of which hues were as shown in Column 5 of the table.

| Run No. | Column 2 | Column 3 | Column 4 | Column 5 |
|---|---|---|---|---|
| 1 | [dichloro-disulfo-amino-triphenodioxazine with sulfo-amino-phenyl-amino substituent] | trifluoro-triazine | NH$_2$C$_2$H$_4$OH | Reddish blue |
| 2 | " | " | [N-methylaniline] | " |
| 3 | " | " | [3-aminobenzenesulfonic acid] | " |
| 4 | [dichloro-disulfo-amino-triphenodioxazine isomer with sulfo-amino-phenyl-amino substituent] | trifluoro-triazine | [2-aminobenzoic acid] | Reddish blue |
| 5 | [dichloro-disulfo-amino-triphenodioxazine isomer with sulfo-amino-phenyl-amino substituent] | trichloro-triazine | NH$_2$C$_2$H$_4$OH | " |
| 6 | " | " | NH$_2$C$_2$H$_5$ | " |

-continued

| Run No. | Column 2 | Column 3 | Column 4 | Column 5 |
|---|---|---|---|---|
| 7 | [triphenodioxazine structure with SO₃H, NH₂, Cl, NH, SO₃H groups] | 2,4,6-trichloro-triazine | NH₂C₂H₄SO₃H | Reddish blue |
| 8 | " | " | NHCH₃–C₂H₄SO₃H | " |
| 9 | [triphenodioxazine structure] | 2,4,6-trifluoro-triazine | NH₂C₂H₄SO₃H | " |
| 10 | [triphenodioxazine structure] | 2,4,6-trifluoro-triazine | C₆H₅NH₂ (aniline) | Reddish blue |
| 11 | " | " | NH₃ | " |
| 12 | " | 2,4,6-trichloro-triazine | " | " |

-continued

| Run No. | Column 2 | Column 3 | Column 4 | Column 5 |
|---|---|---|---|---|
| 13 | (triphenodioxazine with Br, SO₃H, NH₂, SO₃H, NH, NH₂, SO₃H, HO₃S substituents) | 2,4,6-trifluoro-triazine | NH₂C₂H₄OH | Reddish blue |
| 14 | (triphenodioxazine with Cl, SO₃H, NH₂, Br, SO₃H, NH, NH₂, SO₃H, HO₃S substituents) | 2,4,6-trichloro-triazine | NH₂C₂H₄CO₂H | " |
| 15 | (triphenodioxazine with Cl, SO₃H, NH₂, SO₃H, NH, NH₂, CH₃, SO₃H substituents) | " | NH(C₂H₄OH)₂ | " |
| 16 | (triphenodioxazine with Cl, SO₃H, NH₂, SO₃H, Cl, SO₃H, NH, NH₂, SO₃H, HO₃S substituents) | 2,4,6-trifluoro-triazine | 4-chloroaniline | Reddish blue |

-continued
| Run No. | Column 2 | Column 3 | Column 4 | Column 5 |
|---|---|---|---|---|
| 17 | 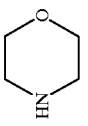 | " | 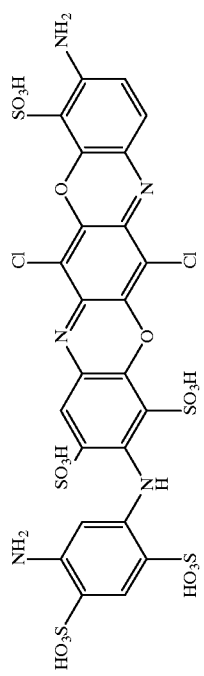 | " |
| 18 | " | " | 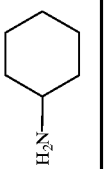 | " |
| 19 | " | " |  | " |

EXAMPLE 11

The asymmetric dioxazine compound obtained in Example 1 (38 parts) was added to water (500 parts). After adding 3-carboxypyridine (3.7 parts) thereto, a substitution reaction was carried out at a pH of 2–5 at 40–80° C. to obtain an asymmetric dioxazine compound represented by the following formula in the free acid form.

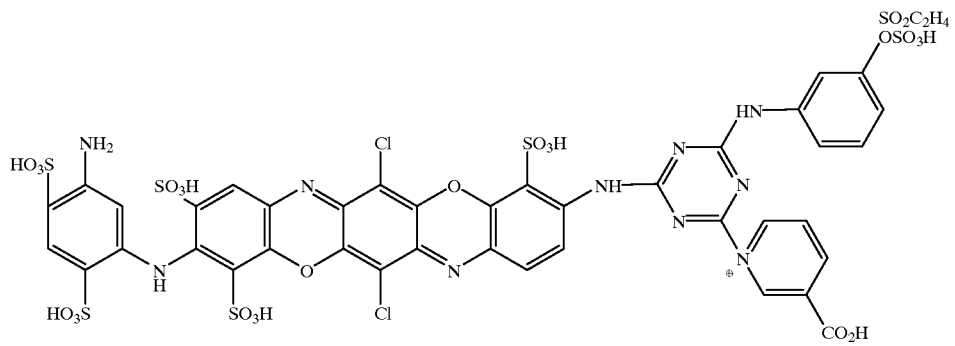

(λmax: 595 nm in aqueous medium)

EXAMPLE 12

Example 11 was repeated except that the asymmetric dioxazine compound was replaced with each of the asymmetric dioxazine compounds obtained in Example 2 using each of the following 10 kinds of amines, respectively. Thus, corresponding asymmetric dioxazine compounds were obtained.

(1)
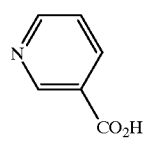

(2)
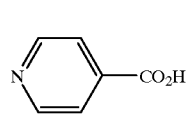

(3)
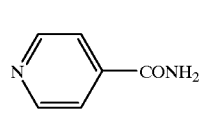

(4)
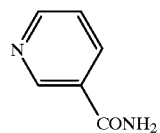

(5)
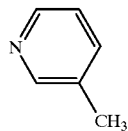

(6)
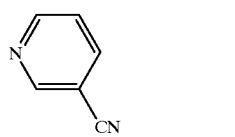

(7)
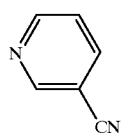

(8)

(9)
(structure with N(CH$_3$)$_3$)

(10)
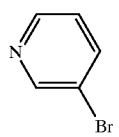

EXAMPLE 13

An asymmetric dioxazine intermediate (26.1 parts) represented by the following formula in the free acid form;

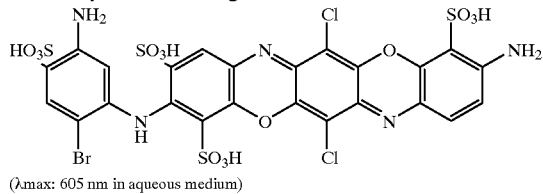

(λmax: 605 nm in aqueous medium)

was added to water (300 parts), to which was added cyanuric chloride (5.5 parts). The mixture was stirred at a pH of 5–6 at 0–20° C. until the reaction was completed. Monoethanolamine (1.8 part) was added thereto and a condensation reaction was carried out. After the reaction, 3-carboxypyridine (3.7 parts) was added thereto and a substitution reaction was carried out to obtain an asymmetric dioxazine compound represented by the following formula in the free acid form:

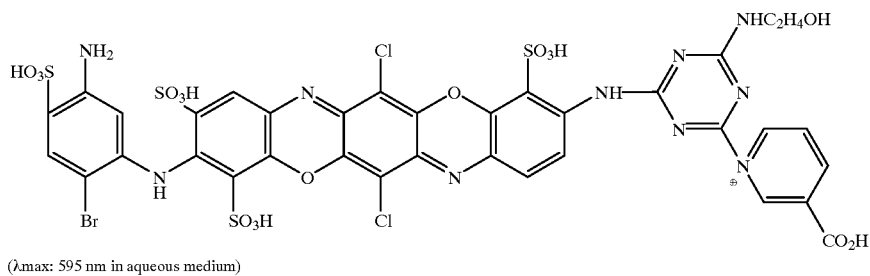

(λmax: 595 nm in aqueous medium)

EXAMPLE 14

Example 13 was repeated except that the dioxazine intermediate, monoethanolamine and 3-carboxypyridine used in Example 13 were replaced with the compounds shown in Column 2, Column 3 and Column 4 of the following table, respectively. Thus, corresponding asymmetric dioxazine compounds were obtained. When used for dyeing, these compounds gave dyed products of which hues were as shown in Column 5 of the table.

| Run No. | Column 2 | Column 3 | Column 4 | Column 5 |
|---|---|---|---|---|
| 1 | [triphenodioxazine structure with Cl, SO₃H, NH₂, and anilino-SO₃H/NH₂ substituents] | NH₂C₂H₄OH | [nicotinic acid, 3-CO₂H pyridine] | Reddish blue |
| 2 | " | NH₂C₂H₅ | " | " |
| 3 | | NH₂C₂H₄SO₃H | | |
| 4 | [triphenodioxazine structure] | NH₂C₂H₄SO₃H | [nicotinamide, 3-CONH₂ pyridine] | Reddish blue |
| 5 | [triphenodioxazine structure] | CH₃—NHC₂H₄SO₃H | [nicotinic acid, 3-CO₂H pyridine] | " |
| 6 | " | [aniline, C₆H₅NH₂] | " | " |

| Run No. | Column 2 | Column 3 | Column 4 | Column 5 |
|---|---|---|---|---|
| 7 | (triphenodioxazine with Cl, Cl, SO₃H, NH₂ groups and anilino substituents bearing NH₂, HO₃S, HO₃S) | NH₃ | (pyridine-3-carboxylic acid / nicotinic acid) | Reddish blue |
| 8 | (triphenodioxazine with Br, Br substituents) | (2-aminobenzoic acid) | " | " |
| 9 | (triphenodioxazine with Cl, Cl substituents, with CH₂SO₃H/NH substituent) | NH₂C₂H₄CO₂H | " | " |
| 10 | (triphenodioxazine with Cl, Cl substituents, with CH₃ substituent) | NH₂C₂H₄OH | (pyridine-4-carboxylic acid / isonicotinic acid) | Reddish blue |

-continued
| Run No. | Column 2 | Column 3 | Column 4 | Column 5 |
|---|---|---|---|---|
| 11 | 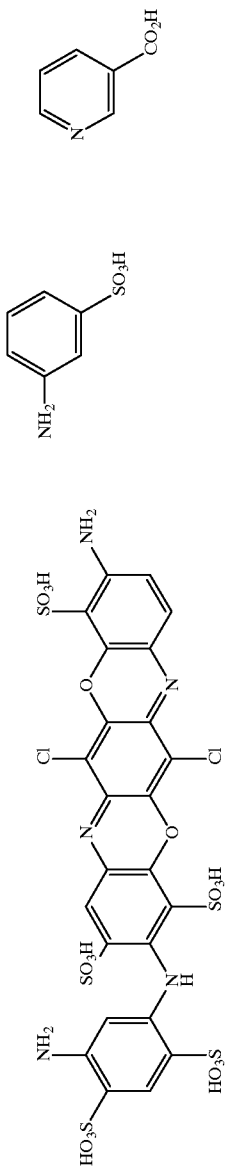 |  |  | " |
| 12 | " | 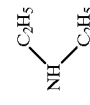 | " | " |
| 13 | " | 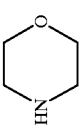 | " | " |

Dyeing Example 1

Each of the asymmetric dioxazine compounds obtained in Example 8 and Example 9 (0.1, 0.3 and 0.6 part portions of every compound) was dissolved into water (200 parts). After adding sodium sulfate (10 parts) and cotton (10 parts) thereto, the temperature was elevated to 50° C., sodium carbonate (4 parts) was added, and dyeing was carried out for one hour. By washing the dyed cotton with water, soaped, again washed with water and dried, there were obtained blue-colored dyed products excellent in fastnesses, particularly chlorine fastness, and having an excellent build-up property.

Dyeing Example 2

Using each of the asymmetric dioxazine compounds obtained in Examples 1–7 and Examples 11–14 (0.1, 0.3 and 0.6 part portions of every compound), dyeing was carried out in the same manner as in Dyeing Example 1, except that the dyeing temperature was 60° C. As the result, blue colored dyed products similarly excellent in fastness properties and build-up property were obtained.

Dyeing Example 3

Using each of the asymmetric dioxazine compounds obtained in Example 10 (0.1, 0.3 and 0.6 part portions of every compound), dyeing was carried out in the same manner as in Dyeing Example 1, except that the dyeing temperature was 80° C. As the result, blue colored dyed products similarly excellent in fastness properties and build-up property were obtained.

Dyeing Example 4

Using each of the asymmetric dioxazine compounds obtained in Examples 1–14, color pastes having the following composition were prepared:

| | |
|---|---|
| Asymmetric dioxazine compound | 5 parts |
| Urea | 5 parts |
| Sodium alginate (5%) stock paste | 50 parts |
| Hot water | 25 parts |
| Sodim bicarbonate | 2 parts |
| Balance | 13 parts |

A mercerized cotton broad cloth was printed with each color paste. After intermediate drying, it was steamed at 100° C. for 5 minutes, washed with hot water, soaped, again washed with hot water and dried. The dyed products thus obtained were excellent in fastness properties, particularly chlorine fastness, and build-up property.

What is claimed is:

1. An asymmetric dioxazine compound represented by the following formula (I) in the free acid form:

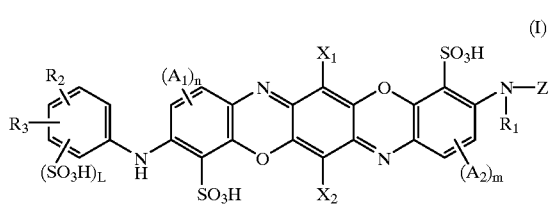

wherein $A_1$ and $A_2$ independently of one another are each sulfo, halo, alkyl or alkoxy, $X_1$ and $X_2$ independently of one another are each hydrogen, halo, alkyl, alkoxy or phenoxy, $R_1$ is hydrogen or unsubstituted or substituted alkyl, $R_2$ and $R_3$ independently of one another are each hydrogen, alkyl, alkoxy, halo or amino which is unsubstituted or substituted once or twice by $C_1$–$C_4$ alkyl, Z is a fiber-reactive group, m and n independent of one another are each 0 or 1, provided that m≠n, and L is 1 or 2.

2. A compound according to claim 1 which is represented by the following formula (II) in the free acid form:

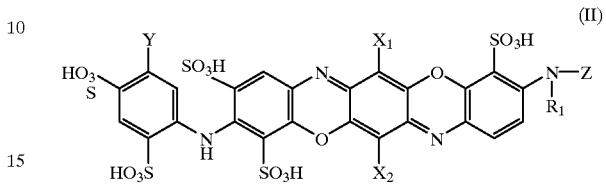

wherein Y is amino which is unsubstituted or substituted once or twice by $C_1$–$C_4$ alkyl, $X_1$, $X_2$, $R_1$ and Z are as defined in claim 1.

3. A compound according to claim 1, wherein $X_1$ and $X_2$ are each independently chloro or bromo.

4. A compound according to claim 1, wherein $R_1$ is hydrogen.

5. A compound according to claim 1, wherein $A_1$ and $A_2$ are each sulfo.

6. A compound according to claim 1, wherein either one of $R_2$ and $R_3$ is unsubstituted or substituted amino.

7. A compound according to claim 1, wherein the fiber-reactive group represented by Z is either one group represented by the following formulas (III), (IV) or (V):

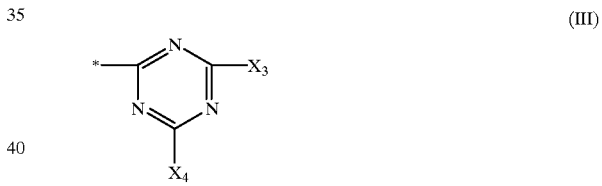

wherein $X_3$ and $X_4$ are each independently chloro, fluoro,

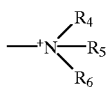

wherein $R_4$, $R_5$ and $R_6$ are each independently unsubstituted or substituted alkyl or

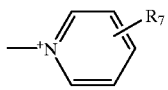

wherein $R_7$ is hydrogen, cyano, carbamoyl, halo, carboxy, sulfo, hydroxy, vinyl or, unsubstituted or substituted alkyl and the mark * is a bond linking to

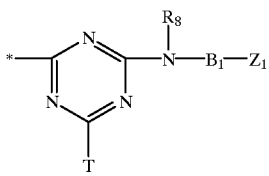
(IV)

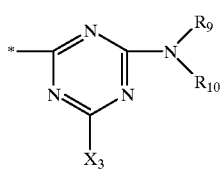
(V)

wherein $X_3$, $R_9$, $R_{10}$ and the mark * are as defined above.

8. A compound according to claim 7, wherein the fiber-reactive group represented by Z is a group represented by the following formula (VI):

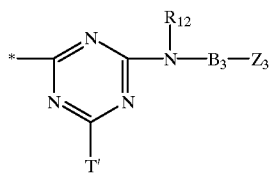
(VI)

wherein $B_1$ is an unsubstituted or substituted phenylene, alkylene or naphthylene group, or —$(CH_2)_p$—Q—$(CH_2)_q$— wherein p and q are each independently 2, 3 or 4, and Q is a —O— or —NR— in which R is hydrogen or $C_1$–$C_4$ alkyl, $R_8$ is hydrogen or unsubstituted or substituted alkyl, $Z_1$ is —$SO_2CH$=$CH_2$ or —$SO_2CH_2CH_2Y_1$, $Y_1$ being a group capable of being split by the action of an alkali, T is halo, alkoxy,

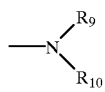

wherein $R_9$ and $R_{10}$ are each independently hydrogen, $C_5$–$C_7$ cycloalkyl or an unsubstituted or substituted alkyl, phenyl, naphthyl or benzyl group, provided that $R_9$ and $R_{10}$ can be taken together with each other to form a ring selected from the group consisting of morpholine, piperidine and pyrrolidine,

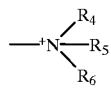

in which $R_4$, $R_5$ and $R_6$ are as defined above,

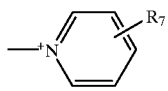

which $R_7$ is as defined above, or

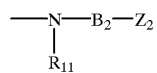

in which $B_2$ is an unsubstituted or substituted phenylene, alkylene or naphthylene group, or —$(CH_2)_p$—Q—$(CH_2)_q$— wherein p and q are each independently 2, 3 or 4, and Q is —O— or —NR— in which R is hydrogen or $C_1$–$C_4$ alkyl, $R_{11}$ is hydrogen or unsubstituted or substituted alkyl and $Z_2$ is —$SO_2CH$=$CH_2$ or —$SO_2CH_2CH_2Y_2$, $Y_2$ being a group capable of being split by the action of an alkali and the mark * is a bond linking to

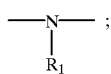

wherein $B_3$ is an unsubstituted or substituted phenylene, alkylene or naphthylene group, or —$(CH_2)_p$—Q—$(CH_2)_q$— wherein p and q are each independently 2, 3 or 4, and Q is —O— or —NR— in which R is hydrogen or $C_1$–$C_4$ alkyl, $R_{12}$ is hydrogen or unsubstituted or substituted alkyl, $Z_3$ is —$SO_2CH$=$CH_2$ or —$SO_2CH_2CH_2Y_3$, $Y_3$ being a group capable of being split by the action of an alkali, T' is chloro, fluoro, alkoxy,

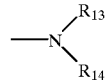

wherein $R_{13}$ is hydrogen or unsubstituted or substituted alkyl and $R_{14}$ is hydrogen or an unsubstituted or substituted alkyl, phenyl or naphthyl group,

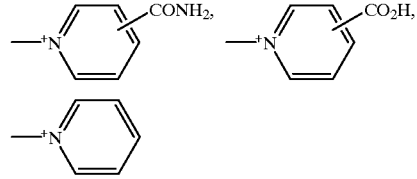

or

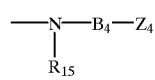

in which $B_4$ is an unsubstituted or substituted phenylene, alkylene or naphthylene group, or —$(CH_2)_p$—Q—$(CH_2)_q$— wherein p and q are each independently 2, 3 or 4, and Q is —O— and —NR— in which R is hydrogen or $C_1$–$C_4$ alkyl, $R_{15}$ is hydrogen or unsubstituted or substituted alkyl, $Z_4$ is —$SO_2CH$=$CH_2$ or —$SO_2CH_2CH_2Y_4$, $Y_4$ being a group capable of being split by the action of an alkali, and the mark * represents a bond linking to

9. An asymmetric dioxazine compound represented by the following formula (I) in the free acid form:

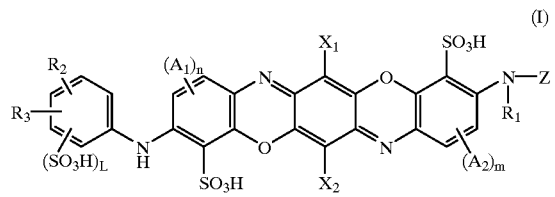

wherein $A_1$ and $A_2$ independently of one another are each sulfo, halo, alkyl or alkoxy, $X_1$ and $X_2$ independently of one another are each hydrogen, halo, alkyl, alkoxy or phenoxy, $R_1$ is hydrogen or unsubstituted or substituted alkyl, $R_2$ and $R_3$ independently of one another are each hydrogen, alkyl, alkoxy, halo or amino which is unsubstituted or substituted once or twice by $C_1$–$C_4$ alkyl, Z is a fiber-reactive group selected from aromatic fiber reactive groups having at least one fiber reactive substituent on a 5- or 6-membered aromatic heterocyclic ring or a poly-condensed aromatic system, aliphatic fiber reactive groups and fiber reactive groups formed by combination of an aromatic fiber reactive group and an aliphatic fiber reactive group which are connected by a suitable bridging group, m and n independent of one another are each 0 or 1, provided that m≠n, and L is 1 or 2.

10. A method for dyeing or printing a fiber material which comprises contacting the asymmetric compound according to claim 1 with the fiber material to be dyed or printed.

* * * * *